INVENTOR
ROBERT H. NORMAN
BY L. J. Craddock
ATTORNEY

Oct. 11, 1960 R. H. NORMAN 2,956,181
PARALLEL FAST CARRY COUNTER WITH SERIAL CARRY GATE PROPAGATION
Filed Jan. 7, 1959 3 Sheets-Sheet 2

INVENTOR
ROBERT H. NORMAN
BY R. J. Craddock
ATTORNEY

Oct. 11, 1960 R. H. NORMAN 2,956,181

PARALLEL FAST CARRY COUNTER WITH SERIAL CARRY GATE PROPAGATION

Filed Jan. 7, 1959 3 Sheets-Sheet 3

INVENTOR
ROBERT H. NORMAN
BY [signature]
ATTORNEY

United States Patent Office 2,956,181
Patented Oct. 11, 1960

2,956,181

PARALLEL FAST CARRY COUNTER WITH SERIAL CARRY GATE PROPAGATION

Robert H. Norman, Glen Oaks, N.Y., assignor to Sperry Rand Corporation, Great Neck, N.Y., a corporation of Delaware Filed Jan. 7, 1959, Ser. No. 785,493

1 Claim. (Cl. 307—88.5)

This invention relates to binary counting circuits which record the number of pulse-type signals that occur in succession on a single line, and more particularly pertains to a parallel fast carry counter with serial carry gate propagation.

Counting circuits are employed to count the frequency of occurrence of a variety of different phenomena, such as the frequency of operation of a machine or of component parts of a machine, the number of nuclear particles present in a region, and are quite often used to count the number of operations or program steps performed in a digital computer.

A variety of types of counting circuits have been used in the past, several of these types being the ripple through counter, the serial fast carry counter, and the parallel fast carry counter. Examples of these counters are shown in Figs. 7–1, 7–2 and 7–3, respectively, in "Arithmetic Operations in Digital Computers," by Richards, published by D. Van Nostrand Company, Inc., New York, 1955. These counters, as well as the counter of this invention, employ a plurality of bistable storage elements, each of which transfers back and forth between first and second stable states upon the reception of a series of successive pulses. Each time a storage element transfers from its second stable state to its first stable state it causes a pulse to be sent to the next succeeding storage element of the counter.

In the description which follows the term "counter" will be used to refer to the counting device as a whole, and the terms "storage element" or "counter stage" will be used to refer to the individual bistable elements of the device.

The first and second of the above-mentioned counters are relatively slow for some applications, and the third above-mentioned counter leads to complex and excessive circuitry when a large number of signal pulses are to be counted.

It is therefore an object of this invention to provide a counter which is relatively fast in operation.

It is another object of this invention to provide a fast counter which may be mechanized with a minimum of circuitry.

A further object of this invention is to provide a fast, reliable counter which avoids the use of complex circuitry.

Other objects and a fuller understanding of the invention may be had by referring to the following description and claim, taken in conjunction with the accompanying drawings in which;

Figure 1:
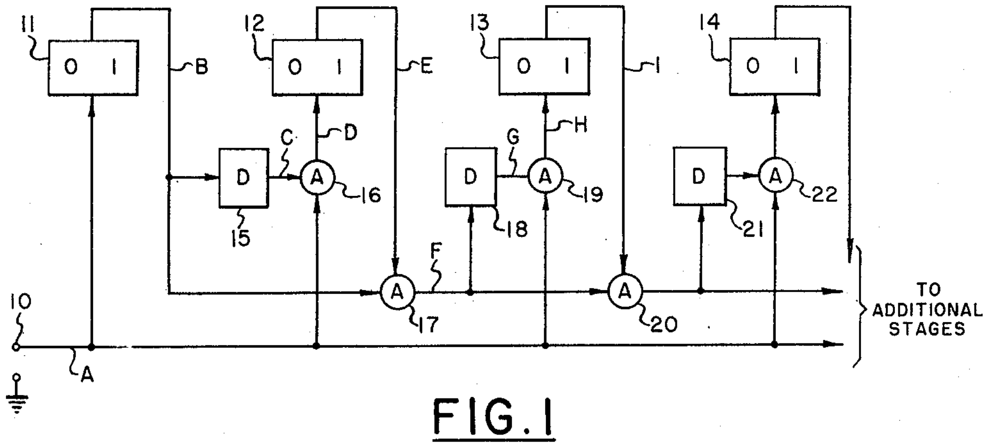
Fig. 1 is a drawing in block diagram form of one embodiment of the counter of the present invention.

Referring now more particularly to Fig. 1, the counter is comprised of a plurality of bistable storage elements, or counter stages, 11, 12, 13 and 14; four elements or stages being shown merely by way of example. The number of storage elements to be employed will be determined by the number of signal pulses to be counted. Each of the bistable storage elements changes from one stable state to another on the reception of each pulse of a succession of respective input pulses. The output signal of each bistable storage element is a waveform which changes substantially instantaneously between two different voltage levels, each voltage level representing a respective stable state. Upon receiving the second and each succeeding alternate input pulse, each bistable storage element changes from its second stable state back to its first stable state.

The individual bistable storage elements, or counter stages 11–14, may take a variety of different forms. One type which has been used successfully is the type disclosed in patent application S.N. 714,281, in the names of David Abraham and Juan F. Bellantoni, filed February 10, 1958, and assigned to applicant's assignee.

A succession of pulse-type input signals to be counted is coupled to input terminal 10 from a source, not shown. The output signal of the first bistable storage element 11 is coupled to a delay means 15 which produces a time delay which is less than the time interval between any two successive input signal pulses from the source. The delayed output signal from delay means 15, and the undelayed output signal from the first bistable storage element 11 are coupled respectively to and-gates 16 and 17 and function as gating signals. And-gates 16 and 17, as well as other and-gates to be mentioned later, are circuits which produce an output signal when and only when all input signals thereto are present simultaneously in a prescribed condition. Several types of and-gates are well known to those skilled in the art. The and-gates employed herein, which are described below, are the type which produce a negative output signal only when two positive signals are applied simultaneously to the two input terminals of the and-gate. In the following description the higher of the two voltage levels of the output signal of each bistable storage element will be referred to as a positive signal, regardless of its absolute value.

The second input terminal of and-gate 16 is coupled to input terminal 10 and receives the succession of input signal pulses. The output signal of and-gate 16 is a series of signal pulses which are passed by gate 16 only when the signals from delay means 16 are coincident with certain input signal pulses. These output signal pulses are coupled to the second bistable storage element 12 whose output signal is also coupled to and-gate 17. A second delay means 18, similar to first delay means 15, is coupled between and-gates 17 and 19. Input signal pulses from terminal 10 are also coupled to and-gate 19. The output of and-gate 19 is another series of signal pulses which are coupled to the third bistable storage element 13 whose output is in turn coupled to and-gate 20, the other input to and-gate 20 being coupled to the output of and-gate 17. The remainder of the circuitry associated with bistable storage element 13 provides the input pulses to bistable storage element 14 and is an exact duplicate of the circuitry associated with the bistable storage element 12 and will not be further explained. All additional stages of the counter will also be identical to the second stage comprised of bistable storage element 12 and its associated circuitry.

Figure 2:
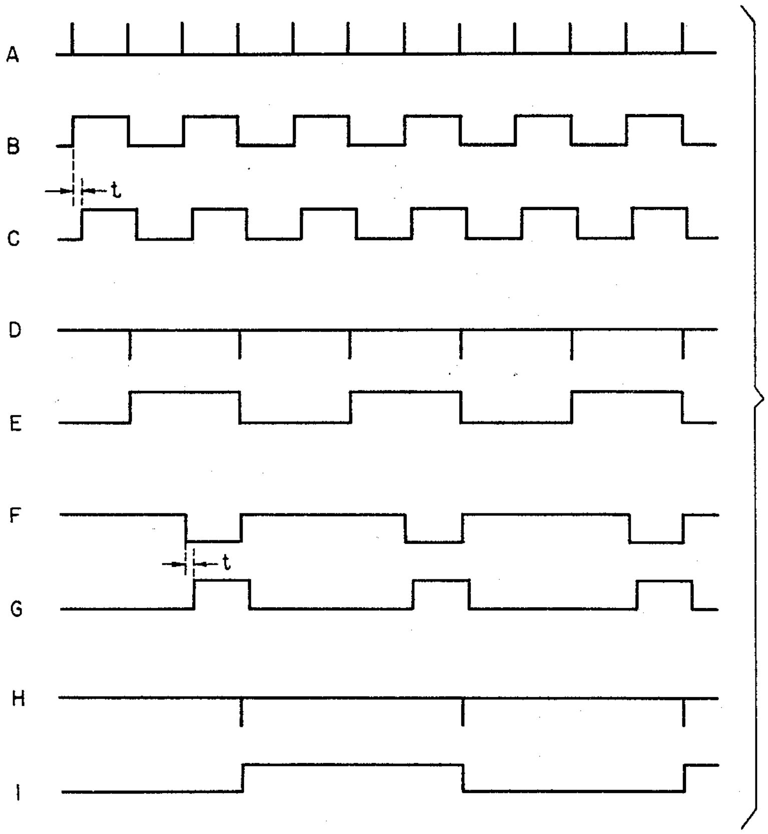
Fig. 2 is a series of waveforms used to explain the operation of the counter of this invention.

The operation of the counter of Fig. 1 will be explained with the aid of the waveforms of Fig. 2. Each of the bistable storage elements 11–14 are initially set to be in a first stable state. As illustrated in Fig. 2, the output signal of each bistable storage element is at the lower of two voltage levels when the bistable element is in the first stable state, and at the higher voltage level when in its second stable state. A series of input signal pulses to be counted, Fig. 2A, is coupled from counter input terminal 10 to the input terminal of bistable storage element 11 and causes bistable element 11 to change from one stable state to the other, Fig. 2B, upon the receipt of each successive input pulse.

The output signal of bistable storage element 11, Fig. 2B, is coupled to delay means 15 where it is delayed a time *t*, Fig. 2C, and then coupled to one input terminal of and-gate 16. The positive pulses of waveform 2C function as gating pulses to allow and-gate 16 to pass the input signal pulses of waveform 2A which occur simultaneously therewith, Fig. 2D. As may be seen from an inspection of Figs. 2A, 2C and 2D, the second and every succeeding alternate input signal pulse to gate 16 is passed to the second bistable storage element 12. Therefore, at the input to the second bistable storage element 12, the number of input signal pulses, Fig. 2A, has been "counted-down" by a factor of two.

The successive input pulses to the second bistable storage element 12, Fig. 2D, cause bistable element 12 to change back and forth between its two stable states, and its output, a series of positive pulses each of which occurs when it is in its second stable state, Fig. 2E, is coupled to a second and-gate 17. The undelayed output of the first bistable storage element 11, Fig. 2B, is also coupled to and-gate 17. The output of and-gate 17 is a series of pulses, Fig. 2F, which result from the simultaneous occurrence of the positive pulses of waveforms 2B and 2E at the input terminals.

The output of and-gate 17 is inverted and delayed a time *t* by delay means 18 to produce the waveform of Fig. 2G which is coupled to an input terminal of a third and-gate 19. The other input terminal of and-gate 19 is coupled to the counter input terminal 10 and receives the input signal pulses from the source. The positive pulses of waveform 2G function as gating pulses to pass the input signal pulses of waveform 2A which occur simultaneously therewith, Fig. 2H.

A comparison of waveforms 2A and 2H reveals that the input signal pulses have been now "counted-down" by a factor of four.

The pulses of waveform 2H are applied to the third bistable storage element 13 which changes from one stable state to the other upon the receipt of each input pulse, Fig. 2I. And-gates 20, 22, and delay means 21 function in a manner similar to the previously discussed components 17, 19 and 18, respectively, to produce an output signal from and-gate 22 which is a "count-down" of the input signal pulses of Fig. 2A by a factor of eight. Subsequent stages of the counter will be identical to the counter stage comprised of bistable storage element 12 and its associated and-gates and delay means, as an example.

In a manner identical with that already described, the input to each subsequent bistable storage element, or counter stage, will be a series of pulses which have been "counted-down" by a factor of two from the number of input pulses to the preceding bistable storage element.

A determination of which one of the two stable states each bistable storage element of the counter is in at a given instant of time will be an indication of the total number of pulses which have been counted up to that instant. As an example, assume that seven pulses from waveform 2A have been received on counter input terminal 10. After the seventh pulse has been received bistable elements 11, 12 and 13 will each be in their second stable state; see waveforms 2B, 2E and 2I.

Bistable storage element 14 and all subsequent elements will all be in their first stable states since none of them will have received an input pulse as yet. Element 13 is in its second stable state, indicating a count of at least four since four pulses must be received before bistable storage element 13 changes to its second stable state. Element 12 is in its second stable state indicating that at least two more pulses have been received since bistable element 13 last changed states, thus indicating a count of at least six. Element 11 is in its second stable state indicating that one more pulse has been received since element 12 last changed states, or a total count of seven.

It may be seen from Fig. 1, that the input signal pulses to be counted are parallel coupled to the individual counter stages and that the gating pulses to the and-gates are serially propagated through the counter. This results in a minimum of delay because the only delay experienced by a signal pulse to be counted is the delay introduced by a single and-gate.

The only time requirement on a serially propagated gating pulse is that its delay in arriving at the and-gate input to a bistable storage element must not exceed the time interval between any two signal pulses to be counted.

In instances where a large number of individual counter stages are required to count a large number of pulses, the delay of the serially propagated gating pulses may closely approach the time interval between input signal pulses. This should be avoided because the counter is likely to miscount when operated under these conditions. If this should occur, a series of "counted-down" signal pulses from an and-gate should be coupled as the input signal to a second series of counter stages which is identical to the first series of counter stages 11–14, etc., Fig. 1. The input terminal of the second series of counter stages would correspond to counter input terminal 10, Fig. 1, and the input signal pulses to the second series of counter stages would be the "counted down" output pulses of the last stage of the first series of counter stages. In this manner the delay between the serially propagated gating pulses and the parallel coupled input signal pulses to be counted is eliminated. In a practical counter constructed in accordance with this invention the configuration of the first series of stages need be repeated just once. This is an advantage over presently known counters wherein the configuration of the first series of stages must be repeated several times.

Although Fig. 2A illustrates the signal pulses to be counted as regularly occurring pulses, the counter of this invention will function in the same manner with irregularly occurring signal pulses.

Another advantageous feature of the present invention is evident from an inspection of Fig. 1, that is, all and-gates employed have only two input terminals, a feature which results in a more simple and more reliable counter.

A further advantageous feature is that except for the first bistable storage element, the output of each bistable storage element drives only one and-gate. This is a marked improvement over the conventional parallel fast carry counter mentioned above wherein each bistable storage element drives $(n-1)$ and-gates, where $n$ is the number of individual counter stages in the counter.

Figures 3, 4:
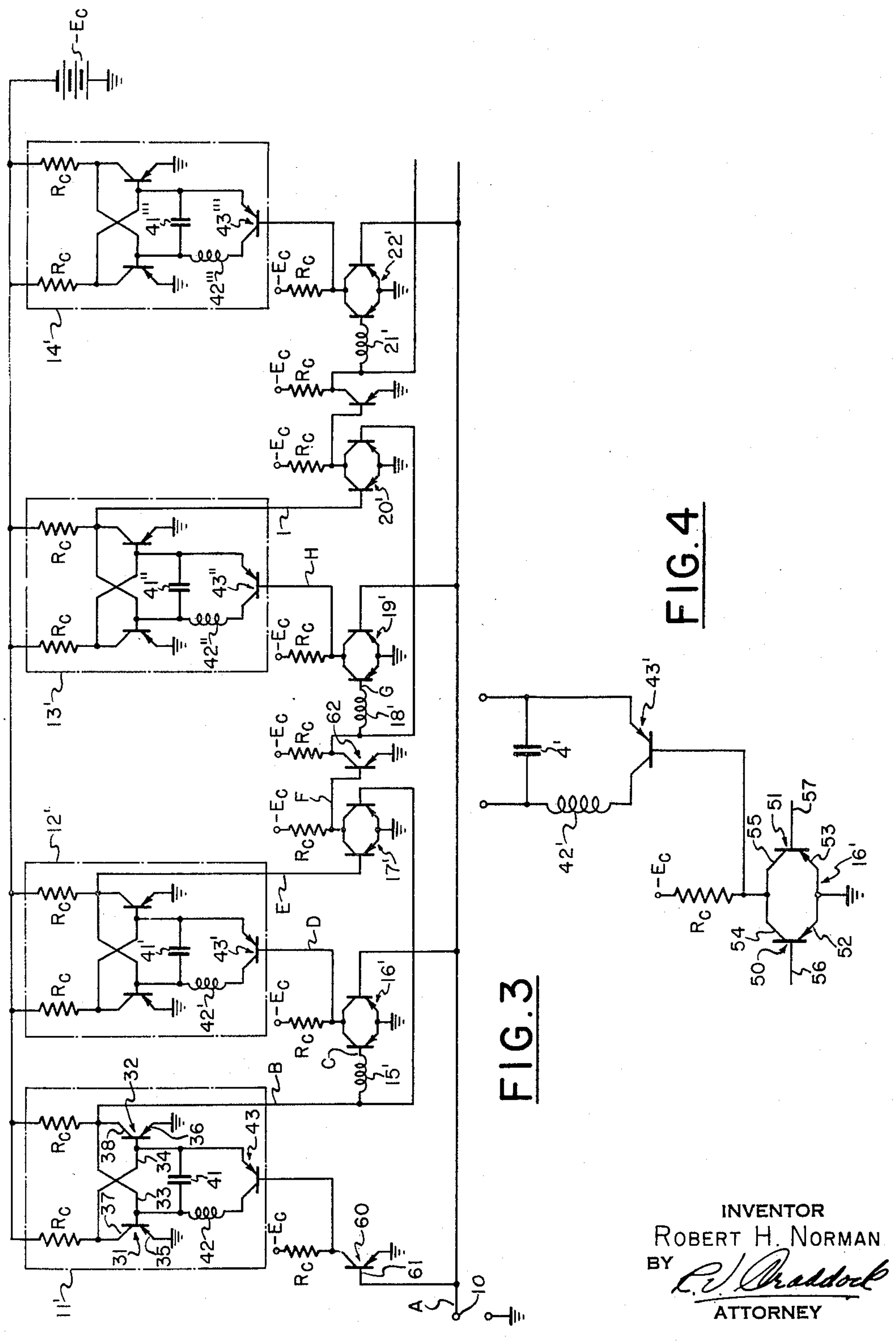
Fig. 3 is a circuit schematic diagram illustrating one manner in which the counter of this invention may be mechanized.
Fig. 4 is a schematic diagram of a form of and-gate which may be employed in the present invention.

Fig. 3 is a circuit schematic diagram of a transistorized counter circuit of the present invention. It will be understood by those skilled in the art that the circuit illustrated in Fig. 3 is not the only way to mechanize the counter of this invention, and it will be further understood that vacuum tubes, magnetic cores, or other logical elements may be employed instead of transistors.

The circuitry within the blocks 11′, 12′, 13′ and 14′ formed by the broken lines represents, respectively, the bistable storage elements designated 11, 12, 13 and 14 in Fig. 1.

Each of the individual bistable storage elements in

Fig. 3 is of the type disclosed in the above-mentioned application S.N. 714,281, to which reference is made for a detailed explanation. Briefly, each storage element, such as 11' for example, operates as follows: PNP type transistors 31 and 32 have their respective bases directly cross-coupled to the collector of the opposite transistor. The respective emitters 35, 36 are coupled to ground, and the collectors 37, 38 are coupled to a source of negative potential $-E_c$ through respective resistors $R_c$. A resonant tank circuit comprised of capacitor 41, inductance 42, and transistor 43, is coupled to the respective bases 33, 34. It may be seen that transistors 31 and 32 are coupled to form a bistable multivibrator circuit having a resonant tank circuit coupled between its two sides. When no pulse is present at the base of transistor 43, oscillations in the tank circuit are prevented since the emitter to collector circuit of transistor 43 is in series with the tank circuit and presents a high impedance. When a negative pulse is applied to the base of transistor 43, it conducts and the tank circuit begins to oscillate.

The pulse is removed after approximately one-half cycle of oscillation causing the tank circuit to cease oscillating, and the multivibrator is then in the opposite stable state. The next pulse applied to the base of transistor 43 will cause the multivibrator to change to its other stable state. Because bistable storage elements 12', 13' and 14' are identical in construction and operation to 11' just described, they will not be further explained.

The delay means 15, 18 and 21 of Fig. 1 are shown in Fig. 3 as choke coils 15', 18' and 21', respectively. And-gates 16, 17, 19, 20 and 22 of Fig. 1 are illustrated in Fig. 3 by the respective pairs of parallel coupled common emitter connected transistors designated 16', 17', 19', 20' and 22'. All of the and-gates are substantially identical in construction and operation. And-gate 16', as an example, is reproduced in Fig. 4 and operates in the following manner. The emitter electrodes 52, 53 of respective PNP type transistors 50, 51 are coupled to ground and the respective collector electrodes 54, 55 are each coupled through a common resistor $R_c$ to a source of negative potential $-E_c$. Coupled to the parallel coupled collectors is the base of the transistor 43' in the tank circuit of bistable storage element 12'. As is evident, transistors 50 and 51 will function as a logical "not" circuit and will produce a negative output pulse only when the input signals to the respective bases 56, 57 are both at a relatively positive potential with respect to $-E_c$, thus causing both transistors to be non-conducting. The negative output of and-gate 16' will cause transistor 43' to conduct and will allow the associated tank circuit to oscillate.

In the operation of the counter circuit of Fig. 3 the input signal pulses to be counted, Fig. 2A, are coupled to the counter input terminal 10. Grounded emitter transistor 60 has its collector coupled through resistor $R_c$ to a negative voltage source $-E_c$, and its base coupled to input terminal 10. Transistor 60 functions as an inverter and upon receiving a positive pulse from terminal 10 at its base 61 causes a negative pulse to be applied to the base of transistor 43. Bistable storage element 11' operates in the manner previously described to produce the output waveform of Fig. 2B. Waveform 2B is delayed by choke coil 15' to produce waveform 2C which is applied to one input terminal of and-gate 16'. The other input to and-gate 16' is the series of input signal pulses of waveform 2A. And-gate 16' functions in the manner described to pass the second and every succeeding alternate input pulse, Fig. 2D, which in turn triggers bistable storage element 12' whose output waveform is Fig. 2E. Waveforms 2E and the output of bistable storage element 11', Fig. 2B, are coupled to and-gate 17' which is identical to 16'. Gate 17' produces an output waveform 2F, which is then inverted by grounded emitter connected transistor 62 which is identical to inverter 60, delayed a time $t$ by a second choke coil 18', and coupled to one input of and-gate 19' as the waveform 2G. The other input to gate 19' is the series of input signal pulses, Fig. 2A. Gate 19' functions in the manner described to pass the fourth and every successive fourth pulse, Fig. 2H, to the third bistable storage element 13'. The remainder of the circuitry associated with bistable storage element 13' is identical to the circuitry associated with bistable storage element 12'.

The number of individual counter stages to be employed depends upon the particular application. All succeeding stages are substantially identical to 12'.

A counter circuit substantially as illustrated in Fig. 3 was constructed and operated successfully over a temperature range of $-55°$ C. to $+75°$ C.; all transistors were type 2N240, manufactured by Philco Corporation. The circuit parameters and operating conditions were substantially as listed below:

| | |
|---|---|
| Voltage sources—$E_c$ | $-1.0$ to $-5.0$ volts D.C. |
| Delay choke coils **15'**, **18'**, **21'**, etc. | 100$\mu$ henries. |
| Resonant circuit choke coils **42**, etc. | 23$\mu$ henries. |
| Resonant circuit condensers **41**, **41'**, etc. | 2700$\mu$ farads. |
| All resistances $R_c$ | 510 ohms. |
| Width of input signal pulses, Fig. 2A | .50$\mu$ seconds to 1.3$\mu$ seconds. |
| Frequency of input signal pulses, Fig. 2A | 0 to 500 kc. |

With the circuit parameters given above it was determined that reliable operation could be obtained with up to 16 individual counter stages at 500 kc. before repeating the configuration.

Figure 5:
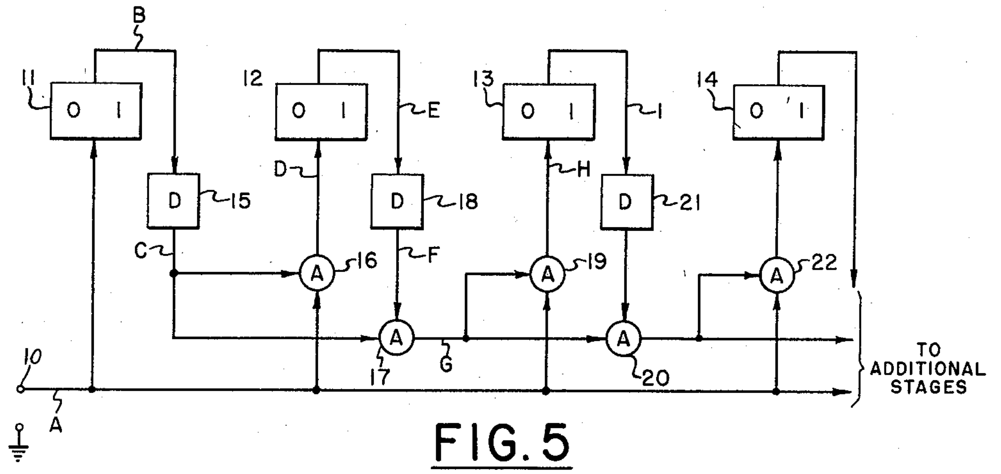
Fig. 5 is another embodiment of the present invention illustrated in block diagram form.

An alternative embodiment of the counter of this invention is illustrated in Fig. 5 in block diagram form. The embodiment of Fig. 5 is quite similar to the presently preferred embodiment of Fig. 1, the only difference being that the delay means 15, 18 and 21 are coupled directly to the output terminals of the respective bistable storage elements 11, 12 and 13 rather than to the input terminals of and-gates 16, 19 and 22 as in Fig. 1.

The operation of the embodiment of Fig. 5 is very similar to the embodiment of Fig. 1, except that an additional delay is introduced to the serially propagated gating pulses, and for this reason the embodiment of Fig. 5 cannot employ as many individual counter stages before repeating the configuration as can the embodiment of Fig. 1. The individual components in the circuitry of Fig. 5 are the same as the individual components of Figs. 1 and 3, described above.

Figure 6:
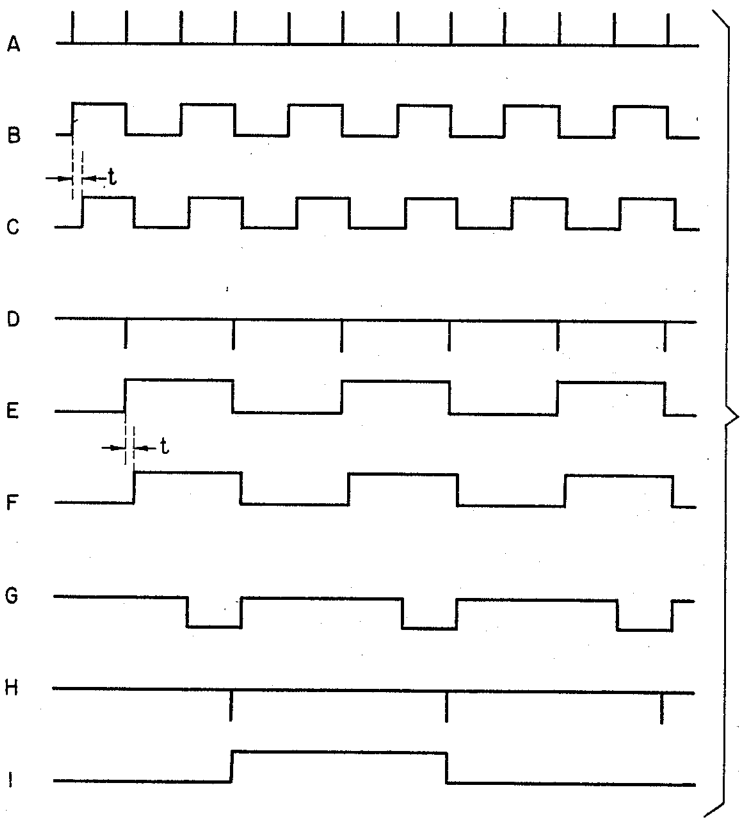
Fig. 6 is a series of waveforms used to help explain the operation of the device of Fig. 5.

In the operation of the embodiment of Fig. 6, each of the bistable storage elements 11–14 is initially in its first stable state during which its output signal is at the lower of the two voltage levels. When in its second stable state the output signal of each storage element is at the higher of the two voltage levels. Input signal pulses to be counted, Fig. 6A, are received at counter input terminal 10 and are coupled to the first bistable storage element 11 which transfers from one stable state to the other upon the receipt of each input signal pulse. The output of storage element 11 is coupled to delay means 15 which delays waveform 6B by a time $t$, Fig. 6C, which is less than the time interval between any two input signal pulses of waveform 6A. The positive pulses of waveform 6C comprise gating pulses which are coupled to and-gates 16 and 17. The second input signal to and-gate 16 is the series of input signal pulses, Fig. 6A. And-gate 16 operates in response to waveforms 6A and 6C in the manner previously described to pass the second and each succeeding alternate input signal pulse, Fig. 6D. The second bistable storage element 12 is coupled to receive the output of and-gate 16 and in response thereto produces the waveform 6E, which is delayed a time $t$ by delay means 18, Fig. 6F, and then coupled to and-gate 17. Waveform 6C is also coupled to and-gate 17 which produces the waveform 6G, a series of gating pulses resulting from the simultaneous occurrence of positive pulses from waveforms 6C and 6F. The gating pulses of waveform 6G and the input signal pulses of waveform 6A are coupled to and-gate 19 which operates as previously described to pass the fourth and every fourth successive pulse thereafter.

The remainder of the individual counter stages comprised of bistable storage elements 13, 14 and their respective associated circuitry are identical to storage element 12 and its associated circuitry.

A comparison of the waveforms of Figs. 2 and 6 will reveal that the embodiments of Figs. 1 and 5 perform the same function, the only difference in their operations being that the serially propagated gating pulses of Fig. 6 each have been delayed by a time $t$.

While the invention has been described in its preferred embodiments, it is to be understood that the words which have been used are words of description rather than of limitation and that changes within the purview of the appended claim may be made without departing from the true scope and spirit of the invention in its broader aspects.

What is claimed is:

A fast carry counter comprising an input terminal for receiving a series of signal pulses to be counted, a first bistable storage element adapted to change from a second stable state to a first stable state upon the application thereto of the second and each succeeding alternate pulse of a series of pulses, said storage element producing an output signal during the occurrence of its second stable state, means for coupling said input terminal to said first storage element, first gating means coupled to said input terminal and to said first storage element and adapted to pass a pulse from said input terminal only when a signal representing the second stable state of said first storage element is simultaneously applied thereto, means for delaying the application of the output signal from said first storage element to said first gating means by a time which is less than the time interval between any two signal pulses to be counted, whereby said first gating means passes the second and each succeeding alternate pulse from said source, a second bistable storage element coupled to receive the output of said first gating means and adapted to change from a second stable state to a first stable state upon the application of the second and each succeeding alternate pulse from said first gating means, said second storage element producing an output signal during the occurrence of its second stable state, a second gating means coupled to said first and second storage means for receiving undelayed output signals from said two storage means and adapted to produce an output signal during the simultaneous application thereto of the respective undelayed signals which represent the respective second stable states of said storage means, a third gating means coupled to receive the output of said second gating means and coupled to receive said series of pulses from said input terminal, and means for delaying the application of the output signal of said second gating means to said third gating means by a time which is less than the time interval between said group of input signal pulses, whereby every fourth pulse of said group of signal pulses is passed by said third gating means.

References Cited in the file of this patent

UNITED STATES PATENTS

| | | |
|---|---|---|
| 2,676,271 | Baldwin | Apr. 20, 1954 |
| 2,774,868 | Havens | Dec. 18, 1956 |

OTHER REFERENCES

"Arithmetic Operations in Digital Computers," by Richards, copyright 1955, pages 72, 73 and 195.